(12) United States Patent
Heber et al.

(10) Patent No.: US 12,276,873 B2
(45) Date of Patent: Apr. 15, 2025

(54) SCREEN FOR A FREE VIEWING MODE AND A RESTRICTED VIEWING MODE

(71) Applicant: siOPTICA GmbH, Jena (DE)

(72) Inventors: André Heber, Weimar (DE); Markus Klippstein, Jena (DE)

(73) Assignee: siOPTICA GmbH, Jena (DE)

( * ) Notice: Subject to any disclaimer, the term of this patent is extended or adjusted under 35 U.S.C. 154(b) by 0 days.

(21) Appl. No.: 18/557,209

(22) PCT Filed: Apr. 12, 2022

(86) PCT No.: PCT/EP2022/059770
§ 371 (c)(1),
(2) Date: Apr. 30, 2024

(87) PCT Pub. No.: WO2022/228890
PCT Pub. Date: Nov. 3, 2022

(65) Prior Publication Data
US 2024/0272464 A1    Aug. 15, 2024

(30) Foreign Application Priority Data
Apr. 26, 2021   (DE) ...................... 10 2021 110 645.1

(51) Int. Cl.
*G02F 1/13* (2006.01)
*B60K 35/22* (2024.01)
(Continued)

(52) U.S. Cl.
CPC ............ *G02F 1/1323* (2013.01); *B60K 35/22* (2024.01); *G02B 6/0036* (2013.01); *G02F 1/133524* (2013.01)

(58) Field of Classification Search
CPC ......................... G02F 1/1347; G02B 6/0036
See application file for complete search history.

(56) References Cited

U.S. PATENT DOCUMENTS

| 5,956,107 A | 9/1999 | Hashimoto et al. |
| 9,881,531 B2 | 1/2018 | Klippstein et al. |
| (Continued) | | |

FOREIGN PATENT DOCUMENTS

| CN | 1987606 A | 6/2007 |
| CN | 107734118 A | 2/2018 |
| (Continued) | | |

*Primary Examiner* — Alexander P Gross
(74) *Attorney, Agent, or Firm* — Christensen, Fonder, Dardi & Herbert PLLC; John P. Fonder (57) ABSTRACT

A display screen which can be operated in at least two operating modes, B1 for an unrestricted viewing mode and B2 for a restricted viewing mode, including a transmissive image rendering device which modulates light that is incident upon it for displaying image content and which can be operated in a first operating mode B1 for an unrestricted viewing mode and in a second operating mode B2 for a restricted viewing mode. The display screen includes an illumination device arranged behind the transmissive image rendering device and which can be operated in at least two operating modes B1 and B2. The illumination device emits light in an unrestricted viewing angle range in mode B1 and emits light in a restricted viewing angle range in mode B2. The display screen further includes a control for the transmissive image rendering device and the illumination device for switching between modes B1 and B2.

12 Claims, 2 Drawing Sheets

(51) Int. Cl.
*F21V 8/00* (2006.01)
*G02F 1/1335* (2006.01)

(56) References Cited

U.S. PATENT DOCUMENTS

| | | |
|---|---|---|
| 11,054,701 B1 | 7/2021 | Heber et al. |
| 2005/0190329 A1* | 9/2005 | Okumura .............. G02F 1/1323 |
| | | 349/123 |
| 2006/0066507 A1 | 3/2006 | Yanagisawa |
| 2007/0008456 A1 | 1/2007 | Lesage et al. |
| 2007/0030240 A1 | 2/2007 | Sumiyoshi et al. |
| 2012/0235891 A1 | 9/2012 | Nishitani et al. |
| 2016/0379394 A1* | 12/2016 | Kim ....................... G02B 30/27 |
| | | 345/629 |
| 2018/0267344 A1 | 9/2018 | Wu |
| 2019/0353838 A1* | 11/2019 | Heber .................. G02B 6/0068 |
| 2020/0012129 A1 | 1/2020 | Wu |
| 2020/0156471 A1 | 5/2020 | Lee |
| 2020/0249504 A1 | 8/2020 | Hopkin et al. |
| 2020/0285108 A1 | 9/2020 | Saitoh et al. |
| 2020/0292746 A1 | 9/2020 | Heber et al. |
| 2020/0371386 A1 | 11/2020 | Liou et al. |
| 2021/0341800 A1* | 11/2021 | Woodgate ............ G02B 5/3083 |

FOREIGN PATENT DOCUMENTS

| | | |
|---|---|---|
| DE | 197 37 942 A1 | 3/1999 |
| DE | 11 2010 004 660 T5 | 10/2012 |
| DE | 10 2017 006 285 A1 | 1/2019 |
| DE | 10 2019 122 837 A1 | 5/2020 |
| DE | 10 2020 001 232 B3 | 3/2021 |
| GB | 2 453 806 A | 4/2009 |
| JP | 2020-118739 A | 8/2020 |
| WO | WO 2012/144471 A1 | 10/2012 |
| WO | WO 2015/121398 A1 | 8/2015 |
| WO | WO 2019/002496 A1 | 1/2019 |
| WO | WO 2019/183525 A1 | 9/2019 |

* cited by examiner

SCREEN FOR A FREE VIEWING MODE AND A RESTRICTED VIEWING MODE

PRIORITY CLAIM

The present application is a National Phase entry of PCT Application No. PCT/EP2022/059770, filed Apr. 12, 2022, which claims priority from German Patent Application No. 10 2021 110 645.1, filed Apr. 26, 2021, the disclosures of which are hereby incorporated by reference herein in their entirety.

FIELD OF THE INVENTION

Great advances have been achieved in recent years for widening the visual angle in LCDs. However, there are often situations in which this very large viewing area of a display screen can be disadvantageous. Increasingly, information such as bank data or other personal information and sensitive data are also available on mobile devices, such as notebooks and tablets. Accordingly, there is a need to supervise viewing access for these sensitive data. It must be possible to choose between a wide viewing angle for sharing information with others on a display, e.g., when viewing vacation photographs or for advertising purposes and, on the other hand, a small viewing angle when it is desirable to treat the displayed information confidentially.

A similar problem arises in the automotive industry. In this case, the driver must not be distracted by image contents, e.g., digital entertainment programs, while the engine is running, whereas the front seat passenger may want to enjoy such image contents during the drive. Consequently, there is a need for a display screen which can switch between the corresponding display modes.

BACKGROUND OF THE INVENTION

Add-on films based on microlouvers have already been used for mobile displays in order to protect the privacy of data viewable on the display. However, these films were not switchable; they always had to be manually applied first and then removed again subsequently. They also had to be carried separately from the display when not in use at a particular time. A further substantial drawback in the use of such louvered films relates to the light losses entailed.

U.S. Pat. No. 5,956,107 A discloses a switchable light source with which a display screen can be operated in a plurality of modes. The disadvantage herein consists in that all of the outcoupling of light is based on scattering and therefore only low efficiency and sub-optimal light direction effects are achieved. In particular, the achievement of a focused light cone is not disclosed more fully.

CN 107734118 A describes a display screen which controllably configures the viewing angle of a display screen by means of two backlights. The upper backlight of the two backlights is supposed to emit focused light for this purpose. In particular, a grating with opaque and transparent portions is mentioned as configuration. However, as a result of this same grating, the light of the second backlight which must penetrate the first backlight in direction of an LCD panel is presumably also focused and, consequently, the public viewing mode which is actually provided for a wide viewing angle suffers from an appreciably reduced angle.

US 2007/030240 A1 describes an optical element for controlling the light propagation direction of light coming from a backlight. This optical element requires, for example, liquid crystals in the form of PDLCs, which are expensive on the one hand but safety-critical on the other hand particularly for end consumer applications, since switching of PDLC liquid crystals generally requires voltages higher than 60V.

CN 1987606 A describes a display screen which, again, controllably configures the viewing angle of a display screen by means of two backlights. In particular, a "first light plate" is used which must be wedge-shaped in order to permit the intended focused outcoupling of light. Exact details about achieving the focused outcoupling of light with corresponding angular conditions are not disclosed.

Further, US 2018/0267344 A1 describes a construction with two flat illumination modules. In this case, the light of the illumination module located in the rear with reference to viewing direction is focused through a separate structure. After focusing, the light must still pass the front illumination module which has scattering elements. Therefore, a strong focusing of light cannot be realized in an optimal manner for a protected view.

Finally, US 2007/0008456 A1 discloses splitting a light emission angle into at least three ranges, light being applied generally to two of these ranges. As a result of this, a protected view in which a display illuminated in this manner is used cannot be viewable solely from one direction.

WO 2015/121398 A1 by the present applicant describes a display screen of the type described above. In this case, essentially scattering particles are present in the volume of the corresponding light guide for toggling between operating modes. However, the scattering particles selected therein, which comprise a polymerizate, generally have the disadvantage that light is coupled out of both large areas so that about one half of the useful light is emitted in the wrong direction, namely, toward the backlight, and cannot be recycled there to a sufficient extent because of the construction. Beyond this, the scattering particles of polymerizate which are distributed in the volume of the light guide can lead to scattering effects under certain circumstances, particularly at higher concentrations, and these scattering effects reduce the protected view effect in the private operating mode.

US2020/012129 A1 discloses an illumination device and a display screen which describe two lights for switching between a narrow viewing mode and a wide viewing mode. On the one hand, one of the light guides is formed with fibers. On the other hand, the scattering outcoupling structure of a light guide is limited to determined strips in projection direction. This is disadvantageous for a homogeneous image illumination and generally also causes unwanted moiré effects in the construction, such as in the interplay with the pixel columns or pixel lines of an LCD panel located above the latter.

The methods and arrangements cited above generally share the disadvantage that they appreciably reduce the brightness of the basic display screen and/or require an active—or at least a special—optical element for mode switching and/or a complicated and expensive production and/or reduce the resolution in the freely viewable mode.

SUMMARY OF THE INVENTION

Therefore, it is the object of the invention to describe a display screen with which information can be securely displayed by means of a selectively restricted viewing angle. In a further operating mode, an open view is to be made possible, this open view being as unrestricted as possible with respect to viewing angle. A resolution which is as high as possible, particularly preferably the native resolution of the utilized display screen, is to be viewable in both operating modes. Further, the restricted viewing angle is to achieve a protected view effect which is as comprehensive as possible without imposing more rigorous demands on an illumination device to be employed.

According to the invention, the above-stated problem is solved by a display screen which can be operated in at least two operating modes, B1 for an unrestricted viewing mode and B2 for a restricted viewing mode. Such a display screen comprises a transmissive image rendering device which modulates light that is incident upon it for displaying image content and which can be operated in the first operating mode B1 for the unrestricted viewing mode and in the second operating mode B2 for the restricted viewing mode. The image rendering device is an LCD panel.

An illumination device which can be operated in the at least two operating modes, B1 for the unrestricted viewing mode and B2 for the restricted viewing mode, is arranged behind the transmissive image rendering device in viewing direction of an observer of the display screen. The illumination device emits light in an unrestricted viewing angle range in the first operating mode B1 and, in the second operating mode B2, emits light in a viewing angle range that is limited compared with the unrestricted viewing angle range.

The image rendering device can be configured in two ways. In a first alternative, the image rendering device comprises either an LCD panel with two liquid crystal layers, of which one serves to modulate the light in order to allow the image content to be displayed and the other serves to switch to a large viewing angle range in the first operating mode B1 for the unrestricted viewing mode and to restrict the viewing angle range in the second operating mode B2 for the restricted viewing mode. The corresponding arrangement is preferably formed as a module and further comprises a polarizing filter behind the rear liquid crystal layer, between the two liquid crystal layers and in front of the front liquid crystal layer, respectively.

It is contemplated that the liquid crystal layer that serves to switch to a larger viewing angle range in the first operating mode B1 for an unrestricted viewing mode and to restrict the viewing angle range in the second operating mode B2 for the restricted viewing mode is located in front of the other liquid crystal layer in viewing direction of an observer and switches the viewing angle range by means of a different polarization for each of the two operating modes B1 and B2. In this way, light which is already color-modulated and image-modulated is polarization-coded for determining the viewing angle range such that, in operating mode B2, at least 90%, preferably over 97%, of this light is extinguished at the front polarizing filter acting as analyzer from oblique viewing direction but not when viewed perpendicularly. Other polarization characteristics are modulated in a corresponding manner for operating mode B1 so that it can pass the analyzer from essentially all incident directions.

In a second alternative, the image rendering device comprises a dual-view LCD panel which simultaneously images two selectable image contents in different viewing angle ranges. In the first operating mode B1 for an unrestricted viewing mode, the two image contents are identical or different. In the second operating mode B2 for a restricted viewing mode, at least one of the image contents is permanently black or monochromatic so that only a black or informationless monochromatic image is visible from the corresponding viewing angle range. White images are also considered monochromatic in this context. A dual-view LCD panel such as that known from the prior art, for example, a barrier screen, a lenticular screen or a prism screen, can image selected groups of pixels in other viewing angle ranges. Application to these pixel groups then makes it possible to determine which pixels, and accordingly which respective image contents, are perceptible from which viewing angle range.

Further, the display screen additionally comprises a control for the transmissive image rendering device and the illumination device for switching between the at least two operating modes B1 and B2. The control for the transmissive image rendering device and the illumination device for switching between the at least two operating modes B1 and B2 preferably comprises an electronic device which preferably, but not necessarily, switches the two operating modes B1 and B2 synchronously for both the image rendering device and the illumination device 2a.

The illumination device comprises a sheet-like backlight and a plate-shaped light guide arranged in front of the backlight in viewing direction with two large surfaces opposite one another which are connected via narrow sides, the light guide having outcoupling elements on at least one of the large surfaces and/or within its volume. Illuminants are arranged laterally of the narrow sides of the light guide.

The outcoupling elements are selected with respect to their shape, quantity per surface area and extent in such a way that every outcoupling element is smaller with respect to its horizontal and vertical dimensions than the minimum of width and height of the smallest pixels of the image rendering device. The pixels are generally color subpixels but may also be monochromatic pixels. Preferably, the outcoupling elements are further selected with respect to their shape, quantity per surface area and extent in such a way that—for at least a subset of the smallest pixels of the image rendering device—portions of, or the entire surface of, at least two outcoupling elements in each instance are arranged below each of the smallest pixels of this subset of the image rendering device in projection directions parallel to the surface normal of the light guide. In particular, the subset can also comprise all of the smallest pixels.

In a first alternative, the backlight emits light in a restricted angular range. In this case, the light guide is transparent to at least 50% of the light emanating from the backlight. In the second operating mode B2, the backlight is switched on and the illuminants are switched off. In the first operating mode B1, at least the illuminants are switched on.

On the other hand, in a second alternative, light that is laterally coupled into at least one of the narrow sides of the light guide is radiated by the light guide in a restricted angular range. In this case, the light guide is transparent to at least 30% of the light emanating from the backlight. In this instance, in contrast to the first alternative, the illuminants are switched on and the backlight is switched off in the second operating mode B2 and at least the backlight is switched on in the first operating mode B1.

In both alternatives, the viewing angle range and the restricted angular range overlap by at least 50%, preferably at least 75%, particularly preferably at least 85%. The greater the overlap, the better the view protection. In reality, the brightness curve does not typically exhibit a step-like behavior but rather a continuous profile similar to a bell curve.

The combination of these steps for implementing the two operating modes B1 and B2 in both the image rendering device and the illumination device has the distinct advantage that particularly the ways in which the second operating mode B2 acts to restrict the viewing angle range are expanded such that the view protection has an especially great effect in this restricted viewing mode. In this regard, it is advantageous when the respective viewing angle ranges of the image rendering device as well as in the illumination device for the second operating mode B2 extensively overlap or are identical.

The illumination device preferably emits light in the second operating mode B2 in a definable restricted viewing angle range in such a way that at most 50%, preferably at most 20%, particularly preferably at most 10%, of the maximum luminance inside of the restricted viewing angle range occurs as maximum luminance value outside of this restricted viewing angle range which is measured in a selectable plane intersecting the display screen. Such a plane for determining the measurement can advantageously comprise, e.g., the perpendicular bisector on the display screen and can extend parallel to the lower edge of the display screen to within a tolerance of 7°.

A "large" viewing angle range is, for example, an angular range, measured in the above-mentioned plane, that extends from about −60° to +60° or from about −60° to +30°, where—without limiting generality—the angle of 0° should coincide with the perpendicular bisectors. A "restricted" viewing angle range would be, for example, from about −30° to +30° or from about −20° to +30° (asymmetry is possible) or from about −10° to +50°. Basically, any area smaller than the half-space in front of the display screen can be considered as a restricted viewing angle range.

Further, it is advantageous for some applications that the aforementioned restricted viewing angle range is formed asymmetrically relative to the surface normal of the backlight. The asymmetry is preferably carried out in a selectable preferential direction. This is helpful particularly in vehicle applications, such as when a display screen according to the invention is arranged in the dashboard about midway between the driver and the front seat passenger as a center information display. In this case, the restricted angular range for viewing which is accessible exclusively by the front seat passenger in operating mode B2 must be configured asymmetrically, i.e., directed toward the front seat passenger. In this instance, the preferential direction in which the asymmetry is formed corresponds to the horizontal.

Further, it may be advantageous to arrange at least one optical component, preferably a diffuser (this can be isotropic or anisotropic) and/or a prism film (this can also have an isotropic or anisotropic effect), between the image rendering device and the light guide.

Further, it is contemplated that the outcoupling elements are distributed on at least one of the large surfaces and/or within the volume of the light guide in such a way that light which is coupled into the light guide by the illuminants and coupled out of the light guide by the outcoupling elements fulfills the following conditions: 1) at least 50% of the light quantity coupled out on one of the large surfaces between an angular range of −50° and +50° relative to the surface normal of the large surface is emitted between an angular range of −20° and +20° with reference to one or two predetermined preferential directions perpendicular to one another and to the surface normal, and/or at least 70% of the light quantity coupled out on one of the large surfaces between an angular range of −50° and +50° relative to the surface normal of the large surface is emitted between an angular range of −30° and +30° referring to the one or two preferential directions, and 2) at least 50% of the light quantity coupled out of the light guide is coupled out in direction away from or toward the backlight.

The illumination device may additionally comprise a collimating film at a suitable location in the construction, for example, a lenticular screen or prism screen above or below the plate-shaped light guide.

The light guide preferably comprises a transparent, thermoplastic or thermoelastic polymer, e.g., plastic, or glass. For example, the light guide or its substrate can comprise at least 40 percent by weight of polymethyl methacrylate, preferably at least 60 percent by weight of polymethyl methacrylate. Alternatively, a polycarbonate (PC) can be used, for example.

The outcoupling elements can be distributed in or on the light guide in various ways in principle during the production of the light guide in accordance with adaptable and pre-determinable conditions for the outcoupling of light. The outcoupling elements are localized structural changes in the volume of, and/or on the surfaces of, the light guide. Therefore, the term "outcoupling element" expressly excludes additional optical layers which are applied to the surfaces of the light guide, such as diffusion layers, reflective layers, (dual) brightness-enhancing, collimating layers or polarization-recycling layers ([dual] brightness enhancement film—(D)BEF) or reflective polarizers. These additional layers which are not covered under the term "outcoupling elements" are connected to the light guide, if at all, only at the edges but mostly rest thereon only loosely in the region of the large surfaces and do not form a physical unit with the light guide. In contrast, coatings which are applied to the large surfaces and which bond with the light guide through chemical reactions or other forces (e.g., van der Waals forces) form a physical unit and are no longer separable from one another. Therefore, such coatings are not considered to be additional layers in the above-defined sense.

The structure of the outcoupling elements can be specified such that the effect of each outcoupling element is known at least approximately, and characteristics of the light guide or of the light exiting from the light guide, respectively, can be appointed selectively by distributing the outcoupling elements in a predefinable manner.

The characteristics which are required of the outcoupling elements, and which are key to the invention, as concerns their quantity per unit area, their shape, their orientation and extent in three dimensions and their distribution over at least one of the large surfaces and/or within the volume of the light guide can be determined, for example, with optics simulation software, such as "LightTools" available from the firm Synopsis or other suppliers, and can then be physically implemented in a corresponding manner.

The distribution of the outcoupling elements on at least one of the large surfaces of, and/or within the volume of, the light guide is advantageously specified in such a way that the out-coupled light reaches a luminance uniformity of 70% on at least 70% of the surface of the light guide. The luminance uniformity can be defined as $Lv^{min}/Lv^{max}$, i.e., as the ratio of the smallest luminance value to the largest luminance value of a surface. Another applicable rule for measuring the luminance uniformity is defined in the "Uniformity Measurement Standard for Displays V1.3" by the German Automotive OEM Work Group Displays. It is possible to apply outcoupling elements on both large surfaces and/or additionally optionally within the volume.

The outcoupling elements for coupling out light on at least one of the large surfaces of the light guide preferably comprise microlenses and/or microprisms and/or diffractive structures and/or three-dimensional structure elements and/or scattering elements, with their greatest dimension having a maximum extent of less than 100 micrometers, preferably less than 50 micrometers. In the case of diffractive structures, this can be, for example, a hologram or a grating/diffraction grating.

However, the outcoupling elements themselves can also have exclusively the outward form of microlenses, microprisms, scattering elements and/or diffractive structures. In this case, they can be configured particularly as cavities which are then formed in the volume of the light guide. These may be voids but are preferably filled with a gaseous, liquid or solid material. The material has a refractive index that diverges from, and is preferably lower than, that of the material used for the light guide. The conduction and coupling out of light can be influenced by the filling and choice of material. Alternatively or additionally, the haze value of the material preferably also diverges from, and is preferably higher than, that of the material used for the light guide. These embodiments have the advantage that light is coupled out more efficiently.

Alternatively and in a simpler manner in technical respects, the cavities can also be formed when the light guide is formed from two, preferably identical, substrate layers which are connected to one another. The connection can be carried out chemically, physically or by gluing. The cavities are then formed as material cutouts on at least one of the boundary surfaces of the substrate layers.

When the outcoupling elements are provided on at least one of the large surfaces of the light guide, it is advantageous when these outcoupling elements are formed from a plastic having structures that are formed by a tool or from glass having a structure that is embossed by a tool. This is possible, e.g., in mass production, in that a UV-curable material, e.g., a paint, a monomer, etc., having tooled structure is applied to a light guide substrate and is hardened, e.g., polymerized, by means of UV radiation. Other radiation-curable materials may also be used. The cutouts for implementing the outcoupling elements may be formed mechanically, by means of lithography or printing or by material deposition, material transformation, material removal or material dissolution, for example.

Accordingly, for example, grating structures, microprisms—either convex with plastic portion facing outward on the surface and/or concave as embossment or cutout within the surface layer of the structured plastic—other three-dimensional structure elements in other shapes, or microlenses can be realized in a cost-effective manner and so as to be suitable for mass production. Concave or convex structures may be utilized indifferently.

The backlight comprises, for example, an area emitter, preferably a further light guide with further illuminants arranged laterally or on the rear surface and at least one light collimator which is integrated in and/or arranged in front of the area emitter, such as at least one prism film and/or at least one privacy filter (microlouver filter). Accordingly, in a corresponding manner, the backlight may be constructed in principle as an LED backlight, for example, a direct lit LED backlight, edge LED backlight, OLED or other area emitter on which, e.g., at least one permanent privacy filter (with microlouvers) is applied.

An advantage of the invention consists in the reduced requirements for the backlight generally compared with the prior art: as a result of combining the view-restricting effects of the image rendering device and illumination device (in which the backlight is integrated), privacy contrasts of 100:1 or higher, such as are required in the prior art, need not be achieved. On the contrary, values of 10:1 in the backlight are already extremely helpful for greatly improving the protected view effect of the image rendering device in operating mode B2. A residual light of the image rendering device in operating mode B2 of, e.g., 0.5% of the maximum brightness at an angle of −40°, would already be reduced to 0.05% if the illumination device emitted only 10% (but not the more difficult to attain value of 1%) of the maximum brightness in −40°.

Means for reducing or controlling reflections, for example, an antireflective coating, can be arranged on the upper side of the display screen and/or on at least one of the large surfaces of the light guide and on at least one of the privacy filters, if any.

In a particularly advantageous manner, the display screen according to the invention is used in a vehicle for selectively displaying image contents only for the front seat passenger in operating mode B2 or for both the driver and the passenger simultaneously in operating mode B1. The former case is helpful, for example, when the passenger is watching entertainment programming which could distract the driver.

A display screen according to the invention can likewise be used to input or display confidential data, for example, PIN numbers, e-mails, SMS or passwords, in automatic tellers, payment terminals or mobile devices.

In all of the embodiments mentioned above, the aforementioned illuminants can be LEDs or LED arrays or laser diodes. Other variants are contemplated and lie within the scope of the invention.

Further, the selected restricted angular ranges for mode B2 for a restricted view can be defined and implemented independent from one another for horizontal direction and for vertical direction. For example, an angle which is larger in the vertical direction than in the horizontal direction (or possibly no restriction at all) could be practical, such as when persons of different sizes are to view an image at automatic teller machines, while viewing from the side should remain largely or completely restricted. For POS payment terminals, on the other hand, safety rules often dictate viewing restrictions in mode B2 in both the horizontal direction and vertical direction. The performance of the invention remains consistent in principle when the above-described parameters are varied within certain limits.

It will be understood that the features mentioned above and those yet to be explained below may be used not only in the stated combinations but also in other combinations or alone without departing from the scope of the present invention.

BRIEF DESCRIPTION OF THE DRAWINGS

The invention will be explained in more detail in the following with reference to drawings which also disclose key features of the invention. These embodiment examples are provided merely to be illustrative and should not be considered as limiting. For example, a description of an embodiment example having a plurality of elements or components should not be interpreted to mean that all of these elements or components are necessary for its implementation. On the contrary, other embodiment examples may also contain alternative elements and components, fewer elements or components, or additional elements or components. Elements or components of different embodiment examples can be combined with one another unless otherwise stated.

Modifications and alterations which are described for one of the embodiment examples may also be applicable to other embodiment examples. Like or comparable elements in the various figures are designated by the same reference numerals and not mentioned repeatedly so as to prevent repetition. The drawings show.

DETAILED DESCRIPTION OF THE DRAWINGS

Figure 1:
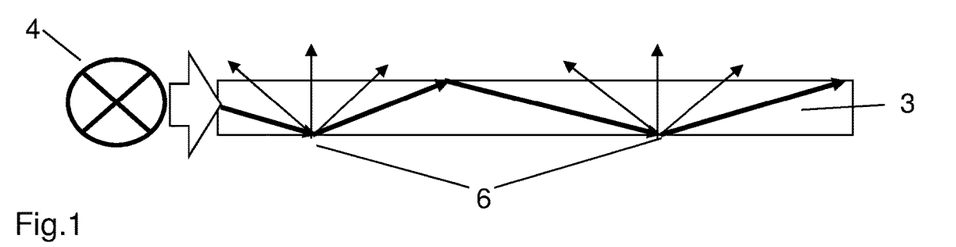
FIG. 1 a schematic diagram showing light that is laterally coupled into a light guide being coupled out from the lower large surface of the light guide on which the outcoupling elements are located, wherein the light exits the light guide at the upper large surface.

FIG. 1 is a schematic diagram showing light that is laterally coupled into a light guide 3 by illuminants 4 being coupled out on the lower large surface of the light guide 3 on which the outcoupling elements 6 are located. However, the coupled-out light exits the light guide 3 at the upper large surface. In this instance, the light is coupled out of the upper large surface of the light guide 3 in a wide angle (greater than 60°) in horizontal direction. The location of the outcoupling elements 6 is indicated by reference numeral 6, but the actual outcoupling elements 6 are not shown here because they must be of microscopic size. Accordingly, light from the illuminants 4, e.g., from LEDs, is laterally coupled into the light guide 3. Because of total internal reflection, rays of the coupled-in light (rays shown in bold) are thrown back again into the light guide 3 at the outer wall until they finally (possibly after numerous times) impinge on an outcoupling element 6 for the required outcoupling. The outcoupling is symbolized by the thin rays. The diagram in FIG. 1 is highly schematic for better clarity. In reality, a very large number of ray paths are realized in the light guide 3. Further, light refractions at refractive transition surfaces are not taken into account.

Figure 2:
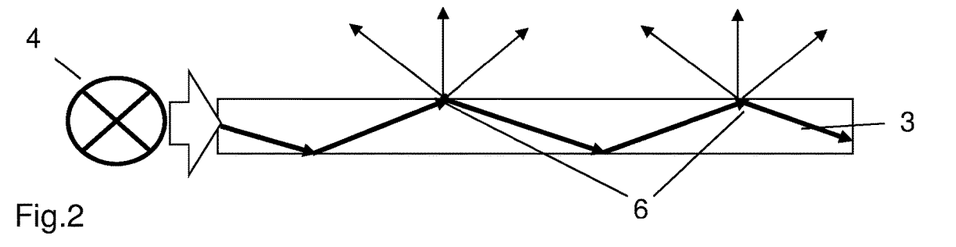
FIG. 2 a schematic diagram showing light that is laterally coupled into a light guide being coupled out from the upper large surface of the light guide on which the outcoupling elements are located, wherein the light exits the light guide at the upper large surface.

FIG. 2 shows a schematic diagram illustrating light which is laterally coupled into a light guide 3 by illuminants 4 being coupled out of the upper large surface of the light guide 3 on which the outcoupling elements 6 are located. In this instance also, the light exits the light guide 3 through the upper large surface. The remarks referring to FIG. 1 apply here in an analogous manner. The difference in technical respects consists merely in the position and possibly the configuration of the outcoupling elements 6 which now lie on the upper side of the light guide 3 and which therefore now couple out the light directly upward. In contrast to the conditions illustrated in FIG. 1, the out-coupled light need not pass once again through the light guide 3.

The schematic diagrams in FIGS. 3, 4, 6 and 7 are sectional views.

Figure 3:
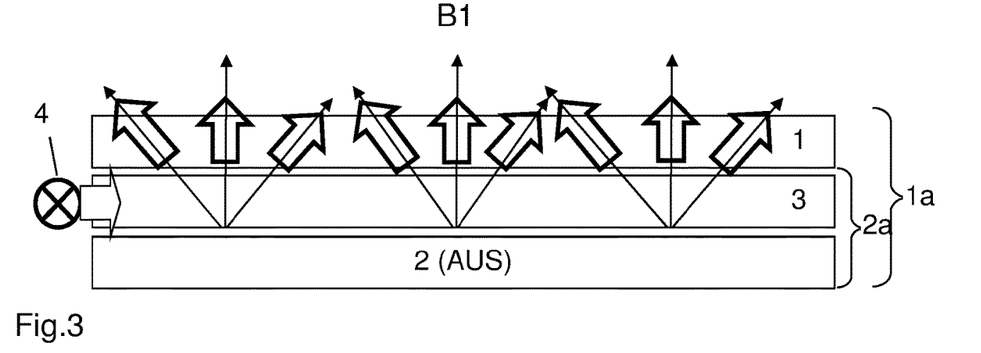
FIG. 3 a schematic diagram showing a first embodiment of a display screen in a first operating mode B1 for an unrestricted viewing mode.
Figure 4:
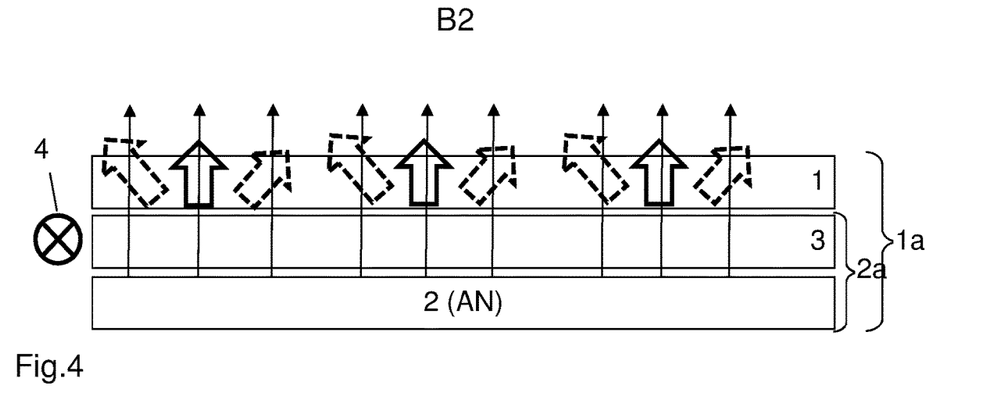
FIG. 4 a schematic diagram showing a first embodiment of a display screen in a second operating mode B2 for a restricted viewing mode.

FIG. 3 is a schematic diagram showing a display screen 1a in a first embodiment in a first operating mode B1 for an unrestricted viewing mode, and FIG. 4 is a schematic diagram showing the display screen 1a in a second operating mode B2 for a restricted viewing mode. A display screen 1a which can be operated in at least the two operating modes, B1 for an unrestricted viewing mode and B2 for a restricted viewing mode, comprises a transmissive image rendering device 1 which modulates light incident upon it for displaying an image content and which can be operated in at least a first operating mode B1 for an unrestricted viewing mode and in a second operating mode B2 for a restricted viewing mode. The image rendering device 1 is an LCD panel. An illumination device 2a which can be operated in the at least two operating modes, B1 for an unrestricted viewing mode and B2 for a restricted viewing mode, is located behind the transmissive image rendering device 1 in viewing direction. The illumination device 2a emits light in an unrestricted viewing angle range in the first operating mode B1 and, in the second operating mode B2, emits light in a viewing angle range that is limited compared with the unrestricted viewing angle range. Further, the display screen 1a also comprises a control for the transmissive image rendering device 1 and the illumination device 2a for switching between the at least two operating modes B1, as is shown by way of example in FIG. 3, and B2, as is shown by way of example in FIG. 4.

In the first embodiment shown here, the illumination device 2a comprises at least one two-dimensionally extensive backlight 2 which radiates light in a limited angular range, a plate-shaped light guide 3 which is located in front of the backlight 2 in viewing direction and has outcoupling elements 6 on at least one of the large surfaces and/or within its volume, the light guide 3 being transparent to at least 50% of the light emanating from the backlight 2, and illuminants 4 arranged laterally of the narrow sides of the light guide 3. In operating mode B2, the backlight 2 is switched on and the illuminants 4 are switched off, whereas in operating mode B1 at least the illuminants 4 are switched on.

In FIG. 3, the wide arrows indicate the passage of the light (narrow arrows) emanating from the illumination device 2a through the image rendering device 1 in all directions. In FIG. 4, conversely, the wide arrows show that the image rendering device 1 only passes light in a limited viewing angle range (wide arrows in dashes indicate that no light or only a maximum of 10% of the light is passed). At the same time, only light limited in the viewing angle range impinges on the image rendering device 1 from the illumination device 2a.

The combination of these steps for implementing operating modes B1 and B2 in both the image rendering device 1 and the illumination device 2a has the distinct advantage that particularly the ways in which the second operating mode B2 acts to restrict the viewing angle range are expanded such that the view protection has an especially great effect in this restricted viewing mode. In this regard, it is advantageous when the respective viewing angle ranges of the image rendering device 1 as well as in the illumination device 2a for operating mode B2 extensively overlap or are identical.

The control—not shown—for the transmissive image rendering device 1 and the illumination device 2a for switching between the at least two operating modes B1 and B2 preferably comprises an electronic device which preferably, but not necessarily, switches the two operating modes B1 and B2 synchronously for both the image rendering device 1 and the illumination device 2a.

In a first alternative, the image rendering device 1 comprises an LCD panel with two liquid crystal layers, of which one serves to modulate the light in order to allow the above-mentioned image content to be displayed and the other serves to switch to a large viewing angle range in the first operating mode B1 for an unrestricted viewing mode and to limit in the second operating mode B2 for a restricted viewing mode. The corresponding arrangement is preferably formed as a module and further comprises a polarizing filter behind the rear liquid crystal layer, between the two liquid crystal layers and in front of the front liquid crystal layer, respectively.

In a second alternative, the image rendering device 1 comprises a dual-view LCD panel which simultaneously images two selectable image contents in different viewing angle ranges. In the first operating mode B1 for the unrestricted viewing mode, the two image contents are identical or different. In the second operating mode B2 for the restricted viewing mode, at least one of the image contents is permanently black or monochromatic—which also includes white—so that only a black or informationless monochromatic image is visible from the corresponding viewing angle range.

It is contemplated that the liquid crystal layer that serves to switch to a larger viewing angle range in the first operating mode B1 for an unrestricted viewing mode and to limit the viewing angle range in the second operating mode B2 for a restricted viewing mode is located in front of the other liquid crystal layer in viewing direction of an observer and switches the viewing angle range by means of a different polarization for each of the two operating modes B1 and B2. In this way, light which is already color-modulated and image-modulated is polarization-coded for determining the viewing angle range such that, in operating mode B2, at least 90%, preferably over 97%, of this light is extinguished at the front polarizing filter (which acts as analyzer) from oblique viewing direction but not when viewed perpendicularly. Other polarization characteristics are modulated in a corresponding manner for operating mode B1 so that it can pass the analyzer from essentially all incident directions.

The illumination device 2a preferably emits light in the second operating mode B2 in a definable restricted viewing angle range in such a way that at most 50%, preferably at most 20%, particularly preferably at most 10%, of the maximum luminance inside of the restricted viewing angle range occurs as maximum luminance value outside of this restricted viewing angle range which is measured in a selectable plane which intersects the display screen 1a. Such a plane for determining the measurement can advantageously comprise, e.g., the perpendicular bisector on the display screen and can extend parallel to the lower edge of the display screen 1a to within a tolerance of 7°.

A "large" viewing angle range is, for example, an angular range, measured in the above-mentioned plane, that extends from about −60° to +600 or from about −60° to +30°, where—without limiting generality—the angle of 0° should coincide with the perpendicular bisectors. A "restricted" viewing angle range would be, for example, from about −30° to +300 or from about −20° to +300 (asymmetry is possible) or from about −10° to +50°.

The outcoupling elements 6 for coupling out light on at least one of the large surfaces of the light guide 3 preferably comprise microlenses and/or microprisms and/or diffractive structures and/or three-dimensional structure elements and/or scattering elements, with their greatest dimension having a maximum extent of 100 micrometers, preferably a maximum of 50 micrometers. In the case of diffractive structures, this can be a hologram or a grating/diffraction grating, for example.

Figure 5:
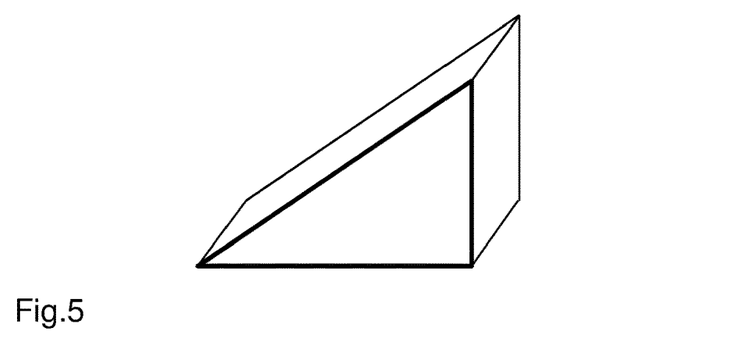
FIG. 5 a schematic diagram showing an exemplary form of an outcoupling element.

FIG. 5 shows a schematic diagram illustrating an exemplary form of an outcoupling element 6, in this case, in the form of a microprism. This type of outcoupling element may be distributed homogeneously or preferably inhomogeneously (such as—with some exceptions—in larger quantities per surface area with increasing distance from the illuminants 4) on one or both large surfaces and/or in the volume of the light guide 3, e.g., as cutout filled with air. Of course, other forms of outcoupling elements 6 are possible.

The outcoupling elements are selected with respect to their shape, quantity per surface area and extent in such a way that every outcoupling element is smaller with respect to its horizontal and vertical dimensions than the minimum of width and height of the smallest pixels of the image rendering device. The pixels are generally color subpixels but may also be monochromatic pixels. Preferably, the outcoupling elements are further selected with respect to their shape, quantity per surface area and extent in such a way that—for at least a subset of the smallest pixels of the image rendering device 1—portions of, or the entire surface of, at least two outcoupling elements in each instance are arranged below each of the smallest pixels of this subset of the image rendering device in projection directions parallel to the surface normal of the light guide. In particular, the subset can also comprise all of the smallest pixels.

Figure 6:
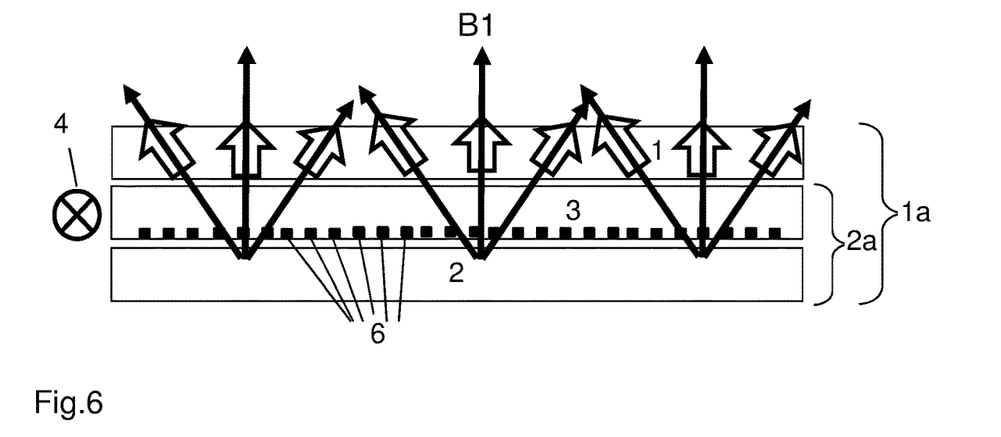
FIG. 6 a schematic diagram of a second embodiment of a display screen in the first operating mode B1 for an unrestricted viewing mode.
Figure 7:
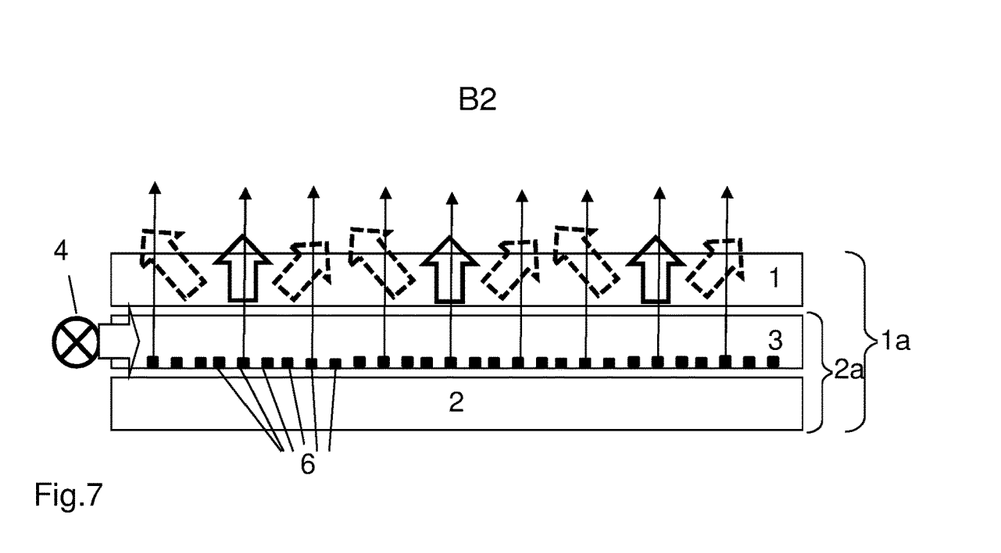
FIG. 7 a schematic diagram of a second embodiment of a display screen in the second operating mode B2 for a restricted viewing mode.

Further, FIG. 6 is a schematic diagram showing a display screen 1a in a second embodiment in the first operating mode B1 for an unrestricted viewing mode, and FIG. 7 is a schematic diagram showing a display screen 1a in a second embodiment in the second operating mode B2 for a restricted viewing mode. This embodiment is an alternative to the embodiment shown in FIG. 3 and FIG. 4. The illumination device 2a shown in FIG. 6 and FIG. 7 comprises at least one two-dimensionally extensive backlight 2 and a plate-shaped light guide 3 which is located in front of the backlight 2 in viewing direction and has outcoupling elements 6 on at least one of the large surfaces and/or within its volume. The light guide 3 is transparent to at least 30% of the light emanating from the backlight 2, and light that is laterally coupled into at least one of the narrow sides of the light guide 3 is emitted by the light guide 3 in a restricted angular range. The illumination device 2a shown in FIG. 6 and FIG. 7 further comprises illuminants 4 arranged laterally of the narrow sides of the light guide 3. In the first operating mode B1 for the restricted viewing mode according to FIG. 6, at least the backlight 2 is switched on, whereas in the second operating mode B2 for the unrestricted viewing mode according to FIG. 7, the illuminants 4 are switched on and the backlight 2 is switched off.

In FIG. 6, the wide arrows indicate the passage of the light (narrow arrows) emanating from the illumination device 2a through the image rendering device 1 in all directions. Conversely, in FIG. 7, the wide arrows show that the image rendering device 1 only passes light in a limited viewing angle range (wide arrows in dashes indicate that no light or only a maximum of 10% of the light is passed). At the same time, only light limited in the viewing angle range impinges on the image rendering device 1 from the illumination device 2a.

The illumination device 2a may additionally comprise a collimating film at a suitable location in the construction, for example, a lenticular screen or prism screen above or below the plate-shaped light guide 3.

The light guide 3 preferably comprises a transparent, thermoplastic or thermoelastic polymer, e.g., plastic, or glass. For example, the light guide or its substrate can comprise at least 40 percent by weight of polymethyl methacrylate, preferably at least 60 percent by weight of polymethyl methacrylate. Alternatively, a polycarbonate (PC) can be used, for example.

The outcoupling elements 6 can be distributed in or on the light guide in various ways in principle during the production of the light guide 3 in accordance with adaptable and pre-determinable conditions for the outcoupling of light. The outcoupling elements 6 are localized structural changes in the volume of, and/or on the surfaces of, the light guide. Therefore, the concept of outcoupling elements 6 expressly excludes additional optical layers which are applied to the surfaces of the light guide 3, such as diffusion layers, reflective layers, (dual) brightness-enhancing, collimating layers or polarization-recycling layers ([dual] brightness enhancement film—(D)BEF) or reflective polarizers. These additional layers which are not covered under the term "outcoupling elements" 6 are connected to the light guide 3, if at all, only at the edges but mostly rest thereon only loosely in the region of the large surfaces and do not form a physical unit with the light guide. In contrast, coatings which are applied to the large surfaces and bond with the light guide 3 through chemical reactions or other forces (e.g., van der Waals forces) form a physical unit and are no longer separable from one another. Therefore, such coatings are not considered to be additional layers in the above-defined sense.

The structure of the outcoupling elements 6 can be specified such that the effect of each outcoupling element 6 is known at least approximately, and characteristics of the light guide 3 or of the light exiting from the light guide 3, respectively, can be appointed selectively by distributing the outcoupling elements 6 in a predefinable manner. The characteristics which are required of the outcoupling elements 6, and which are key to the invention, as concerns their quantity per unit area, their shape, their orientation and extent in three dimensions and their distribution over at least one of the large surfaces and/or within the volume of the light guide 3 can be determined, for example, with optics simulation software, such as "LightTools" available from the firm Synopsis or other suppliers, and can then be physically implemented in a corresponding manner. It is possible to provide outcoupling elements 6 on both large surfaces and/or, in addition, optionally in the volume of the light guide 3.

The backlight 2 comprises, for example, an area emitter, preferably a further light guide with further illuminants arranged laterally or on the rear surface and at least one light collimator which is integrated in and/or arranged in front of the area emitter, such as at least one prism film and/or at least one privacy filter (microlouver filter). Accordingly, in a corresponding manner, the backlight 2 may be constructed in principle as an LED backlight, for example, as a direct lit LED backlight, edge LED backlight, OLED or other area emitter on which, e.g., at least one permanent privacy filter (with microlouvers) is provided.

An advantage of the above-described display screen consists in the reduced requirements for the backlight 2 generally compared with the prior art: as a result of combining the view-restricting effects of the image rendering device 1 and illumination device 2a (in which the backlight 2 is integrated), privacy contrasts of 100:1 or higher, which are required in the prior art, need not be achieved. On the contrary, values of 10:1 in the backlight 2 are already highly conducive to a greatly improved protected view effect of the image rendering device 1 in operating mode B2. A residual light of the image rendering device 1 in operating mode B2 of, e.g., 0.5% of the maximum brightness at an angle of −40°, would already be reduced to 0.05% if the illumination device emitted only 10% (but not the more difficult to attain value of 1%) of the maximum brightness in −40°.

In a particularly advantageous manner, the display screen is used in a vehicle for selectively displaying image contents only for the front seat passenger in operating mode B2 or for both the driver and the passenger simultaneously in operating mode B1. The former case is helpful, for example, when the passenger is watching entertainment programming which could distract the driver. A display screen such as that described above can likewise be used for inputting or displaying confidential data, for example, PIN numbers, e-mails, SMSes or passwords, in automatic tellers, payment terminals or mobile devices.

In all of the embodiments mentioned above, the aforementioned illuminants 4 can be LEDs, LED arrays or laser diodes. Other variants are contemplated and lie within the scope of the invention.

The above-described illumination device and the display screen which can be implemented therewith solve the proposed problem. A display screen has been described by which information may be securely displayed by means of a selectively restricted viewing angle, while an open view is enabled in a further operating mode with a viewing angle that is as unrestricted as possible. The highest possible resolution, i.e., the native resolution of the utilized display screen, is viewable in both operating modes. Further, the restricted viewing angle achieves the most comprehensive possible protected view effect without imposing greater demands on the utilized illumination device.

The above-described display screen can advantageously be applied anywhere that confidential data are displayed and/or entered, such as pin number entry or data display in money dispensing machines or payment terminals or for entering passwords or when reading e-mails on mobile devices. It can also be applied in passenger vehicles, as has been described above.

REFERENCE CHARACTERS 1 image rendering device
1a display screen
2 backlight
2a illumination device
3 light guide
4 illuminant
6 outcoupling element

The invention claimed is:
1. A display screen which can be operated in at least two operating modes, B1 for an unrestricted viewing mode and B2 for a restricted viewing mode, comprising:
   a transmissive image rendering device which modulates light that is incident upon it for displaying an image content and which can be operated in at least the first operating mode B1 for an unrestricted viewing mode and in the second operating mode B2 for a restricted viewing mode, wherein the transmissive image rendering device comprises an LCD panel with two liquid crystal layers, one of which serves to modulate the light in order to enable display of the image content, and the other serves to switch to a large viewing angle range in the first operating mode B1 for an unrestricted viewing mode and to limit the viewing angle range in the second operating mode B2 for a restricted viewing mode, an illumination device which is located behind the transmissive image rendering device in a viewing direction of an observer and which can be operated in at least the two operating modes, B1 for an unrestricted viewing mode and B2 for a restricted viewing mode, wherein the illumination device emits light in an unrestricted viewing angle range in the first operating mode B1 and emits light in a limited viewing angle range in the second operating mode B2, wherein the respective viewing angle ranges of the transmissive image rendering device and of the illumination device for operating mode B2 strongly overlap or are identical, wherein the illumination device comprises at least:

i. a two-dimensionally extensive backlight which emits light in a limited angular range, ii. a plate-shaped light guide which is situated in front of the backlight in the viewing direction and which has outcoupling elements on at least one of the large surfaces and/or within its volume, wherein the light guide is transparent to at least 50% of the light emanating from the backlight, iii. illuminants arranged laterally at narrow sides of the light guide, wherein the backlight is switched on and the illuminants are switched off in operating mode B2, wherein, further, at least the illuminants are switched on in operating mode B1, and wherein the outcoupling elements are selected with respect to their shape, quantity per surface area and extent in such a way that:

i. every outcoupling element is smaller with respect to its horizontal and vertical dimensions than the minimum of width and height of smallest pixels of the transmissive image rendering device, and that ii. portions of, or the entire surface of, at least two outcoupling elements in each instance are arranged below each of the smallest pixels of the transmissive image rendering device in projection directions parallel to the surface normal of the light guide, and a control for the transmissive image rendering device and the illumination device for switching between the at least two operating modes B1 and B2; and wherein at least one optical component is arranged between the image rendering device and the light guide, and wherein the at least one optical component is a diffuser and/or a prism film.

2. The display screen according to claim 1, wherein the liquid crystal layer that serves to switch to a large viewing angle range in the first operating mode B1 for an unrestricted viewing mode and to limit the viewing angle range in the second operating mode B2 for a restricted viewing mode is located in front of the other liquid crystal layer in the viewing direction of an observer and switches the viewing angle range via a different polarization for each of the two operating modes B1 and B2.

3. The display screen according to claim 1, wherein the outcoupling elements comprise microlenses and/or microprisms and/or diffractive structures and/or three-dimensional structure elements and/or scattering elements.

4. The display screen according to claim 1, wherein the illumination device in operating mode B2 emits more than 1% of its maximum brightness at an angle of −40° in the horizontal or vertical direction.

5. The display screen according to claim 1, wherein the illumination device in operating mode B2 emits at least 10% of its maximum brightness at an angle of −40° in the horizontal or vertical direction.

6. A display screen which can be operated in at least two operating modes, B1 for an unrestricted viewing mode and B2 for a restricted viewing mode, comprising:

a transmissive image rendering device which modulates light that is incident upon it for displaying an image content and which can be operated in at least a first operating mode B1 for an unrestricted viewing mode and in a second operating mode B2 for a restricted viewing mode, wherein the image rendering device comprises a dual-view LCD panel which simultaneously images two selectable image contents in different viewing angle ranges, wherein, in the first operating mode B1 for an unrestricted viewing mode, the two image contents are identical or different, and wherein, in the second operating mode B2 for a restricted viewing mode, at least one of the image contents is permanently black or monochromatic so that only a black or informationless monochromatic image is visible from the corresponding viewing angle range, an illumination device which is located behind the transmissive image rendering device in a viewing direction of an observer and which can be operated in at least two operating modes, B1 for an unrestricted viewing mode and B2 for a restricted viewing mode, wherein the illumination device emits light in an unrestricted viewing angle range in the first operating mode B1 and emits light in a restricted viewing angle range in the second operating mode B2, wherein the respective viewing angle ranges of the image rendering device and of the illumination device for operating mode B2 strongly overlap or are identical, and wherein the illumination device comprises at least:

i. a two-dimensionally extensive backlight which emits light in a limited angular range, ii. a plate-shaped light guide which is situated in front of the backlight in the viewing direction and which has outcoupling elements on at least one of the large surfaces and/or within its volume, wherein the light guide is transparent to at least 50% of the light emanating from the backlight, iii. illuminants arranged laterally at narrow sides of the light guide, wherein the illumination device in operating mode B2 emits more than 1% of its maximum brightness at an angle of −40° in the horizontal or vertical direction, and wherein the backlight is switched on and the illuminants are switched off in operating mode B2, wherein, further, at least the illuminants are switched on in operating mode B1, and wherein the outcoupling elements are selected with respect to their shape, quantity per surface area and extent in such a way that:

i. every outcoupling element is smaller with respect to its horizontal and vertical dimensions than the minimum of width and height of the smallest pixels of the image rendering device, and that ii. portions of, or the entire surface of, at least two outcoupling elements in each instance are arranged below each of the smallest pixels of the image rendering device in projection directions parallel to the surface normal of the light guide, and a control for the transmissive image rendering device and the illumination device for switching between the at least two operating modes B1 and B2; and wherein at least one optical component is arranged between the image rendering device and the light guide, and wherein the at least one optical component is a diffuser and/or a prism film.

7. The display screen according to claim 6, wherein the illumination device emits light in the second operating mode B2 in a definable restricted viewing angle range in such a way that at most 50%, of the maximum luminance inside of the restricted viewing angle range occurs as maximum luminance value outside of this restricted viewing angle range which is measured in a selectable plane intersecting the display screen.

8. The display screen according to claim 6, wherein the illumination device emits light in the second operating mode B2 in a definable restricted viewing angle range in such a way that at most 10%, of the maximum luminance inside of the restricted viewing angle range occurs as maximum luminance value outside of this restricted viewing angle range which is measured in a selectable plane intersecting the display screen.

9. The display screen according to claim 6, wherein the outcoupling elements are distributed on at least one of the large surfaces and/or within the volume of the light guide in such a way that light which is coupled into the light guide by the illuminants and coupled out of the light guide by the outcoupling elements fulfills the following conditions:
at least 50% of the light quantity coupled out on one of the large surfaces between an angular range of −50° and +50° relative to the surface normal of the large surface is emitted between an angular range of −20° and +20° with reference to one or two predetermined directions perpendicular to one another and to the surface normal, and/or at least 70% of the light quantity coupled out on one of the large surfaces between an angular range of −50° and +50° relative to the surface normal of the large surface is emitted between an angular range of −30° and +30° referring to the one or two predetermined directions, and
at least 50% of the light quantity coupled out of the light guide is coupled out in direction away from or toward the backlight.

10. The display screen according to claim 6, wherein the restricted viewing angle range is formed asymmetrically relative to the surface normal of the backlight in a predetermined direction.

11. A method of using the display screen of claim 6 in a vehicle including selectively displaying image contents only for the front seat passenger in operating mode B2 and for both the driver and the passenger simultaneously in operating mode B1.

12. The display screen according to claim 6, wherein the illumination device in operating mode B2 emits at least 10% of its maximum brightness at an angle of −40° in the horizontal or vertical direction.

* * * * *

UNITED STATES PATENT AND TRADEMARK OFFICE
CERTIFICATE OF CORRECTION

| | | |
|---|---|---|
| PATENT NO. | : 12,276,873 B2 | Page 1 of 1 |
| APPLICATION NO. | : 18/557209 | |
| DATED | : April 15, 2025 | |
| INVENTOR(S) | : Heber et al. | |

It is certified that error appears in the above-identified patent and that said Letters Patent is hereby corrected as shown below:

In the Specification

In Column 11, Line 56, delete "+600" and insert -- +60° --, therefor.

In Column 11, Line 60, delete "+300" and insert -- +30° --, therefor.

In Column 11, Line 60, delete "+300" and insert -- +30° --, therefor.

Signed and Sealed this
Twenty-fourth Day of June, 2025

Coke Morgan Stewart
*Acting Director of the United States Patent and Trademark Office*